(12) United States Patent
Cheng et al.

(10) Patent No.: US 7,428,149 B2
(45) Date of Patent: Sep. 23, 2008

(54) AIR GUIDE DEVICE AND COMPUTER HOUSING APPLYING THE AIR GUIDE DEVICE

(75) Inventors: Sheng-Hsiung Cheng, Taipei Hsien (TW); Te-An Lin, Taipei Hsien (TW); Wu-Nan Wang, Taipei Hsien (TW); Chia-Chia Huang, Taipei Hsien (TW)

(73) Assignee: Aopen Inc., Taipei (TW)

( * ) Notice: Subject to any disclaimer, the term of this patent is extended or adjusted under 35 U.S.C. 154(b) by 0 days.

(21) Appl. No.: 11/607,487

(22) Filed: Nov. 30, 2006

(65) Prior Publication Data

US 2008/0002360 A1 Jan. 3, 2008

(30) Foreign Application Priority Data

Jun. 30, 2006 (TW) .............................. 95123914 A

(51) Int. Cl.
*H05K 7/20* (2006.01)
*H05K 5/00* (2006.01)

(52) U.S. Cl. ...................... 361/690; 361/687; 165/80.3; 454/184; 454/354

(58) Field of Classification Search ................. 361/687, 361/690, 694–695; 165/80.3, 104.33; 454/184, 454/354
See application file for complete search history.

(56) References Cited

U.S. PATENT DOCUMENTS

| | | | | |
|---|---|---|---|---|
| 5,456,632 A | * | 10/1995 | Ohtsu et al. ................. | 454/184 |
| 5,741,030 A | * | 4/1998 | Moore et al. ................... | 285/23 |
| 6,174,231 B1 | * | 1/2001 | Bodin ......................... | 454/184 |
| 6,587,335 B1 | * | 7/2003 | Nelson et al. ............... | 361/687 |
| 6,791,837 B2 | * | 9/2004 | Chen et al. ................... | 361/695 |
| 6,871,879 B2 | * | 3/2005 | Gan ........................... | 285/189 |
| 6,967,838 B2 | * | 11/2005 | Li ............................... | 361/687 |
| 7,088,584 B2 | * | 8/2006 | Chen ........................... | 361/695 |
| 7,100,676 B2 | * | 9/2006 | Li et al. ..................... | 165/80.3 |
| 7,126,819 B2 | * | 10/2006 | Liang ......................... | 361/695 |
| 7,165,604 B2 | * | 1/2007 | Huang ........................ | 165/121 |
| 7,204,750 B2 | * | 4/2007 | Shen et al. .................. | 454/184 |
| 7,286,350 B2 | * | 10/2007 | Lee et al. .................... | 361/695 |
| 2005/0274498 A1 | * | 12/2005 | Li et al. ..................... | 165/121 |
| 2006/0023419 A1 | * | 2/2006 | Kao et al. ................... | 361/690 |
| 2006/0188370 A1 | * | 8/2006 | Chen et al. ................. | 415/220 |
| 2007/0243815 A1 | * | 10/2007 | Lai ............................. | 454/184 |

* cited by examiner

*Primary Examiner*—Jayprakash N Gandhi
*Assistant Examiner*—Robert J Hoffberg
(74) *Attorney, Agent, or Firm*—Schwabe, Williamson & Wyatt, P.C.

(57) ABSTRACT

An air guide device is provided on a side panel of a computer housing, and includes an air guide member and a positioning mechanism. The air guide member includes a first coupling portion and a second coupling portion disposed opposite to the first coupling portion for coupling with the first coupling portion. The positioning mechanism includes at least one positioning member for coupling a bottom portion of the air guide member to the side panel. The air guide member is convertible between a state of use where the air guide member is in the form of a hollow cylinder, and the first and second coupling portions are coupled, and an unfurled state where the air guide member is in the form of a flat sheet, and the first and second coupling members are separated.

36 Claims, 18 Drawing Sheets

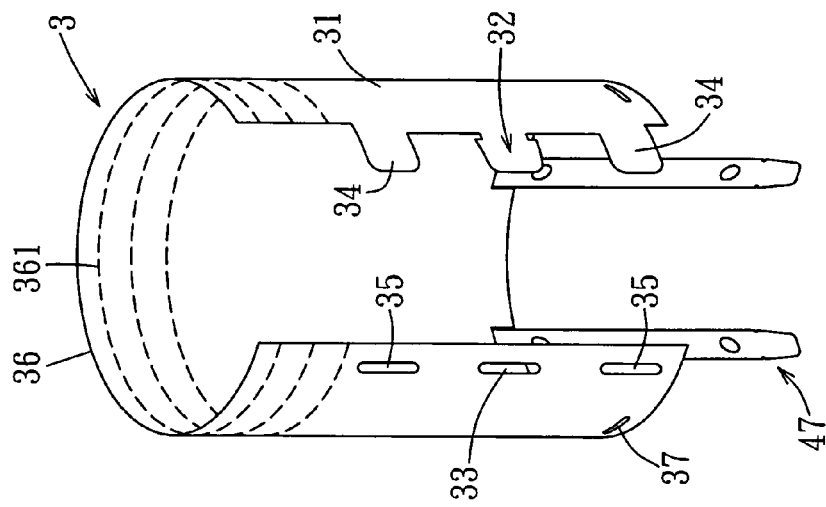
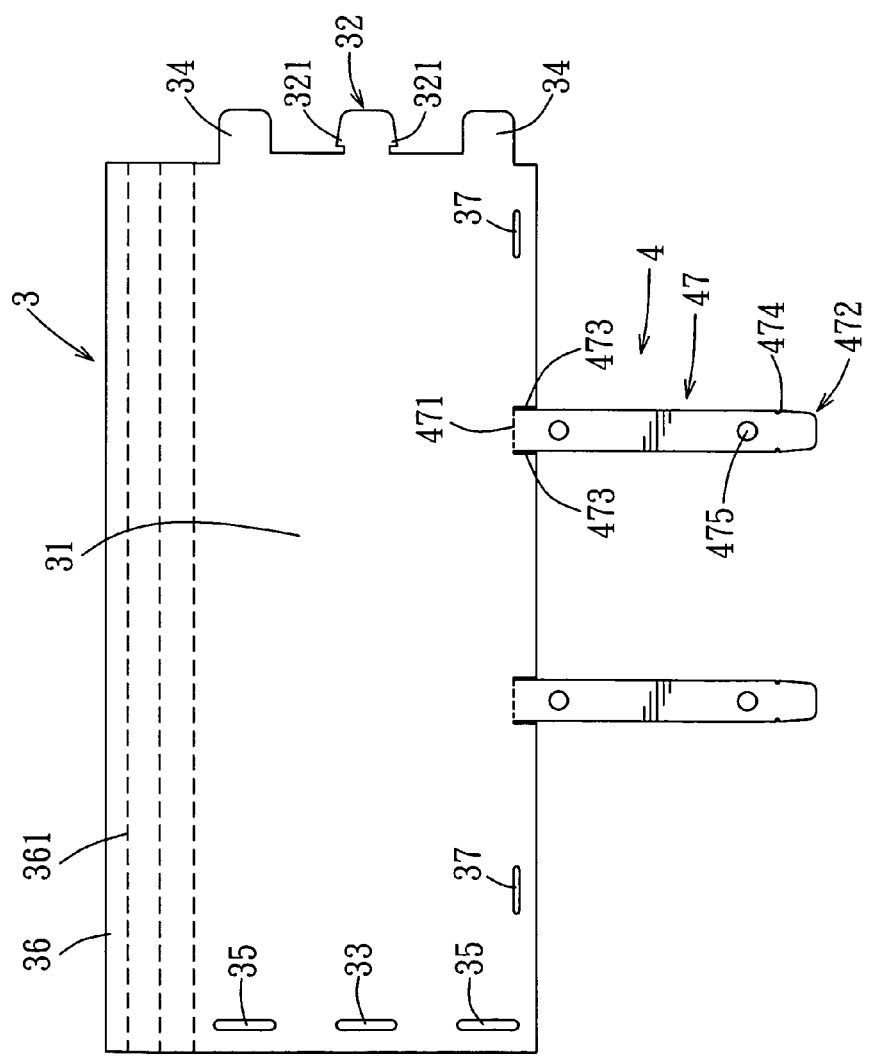
FIG. 14
FIG. 13

AIR GUIDE DEVICE AND COMPUTER HOUSING APPLYING THE AIR GUIDE DEVICE

CROSS-REFERENCE TO RELATED APPLICATION

This application claims priority of Taiwanese Application No. 095123914, filed on Jun. 30, 2006.

BACKGROUND OF THE INVENTION

1. Field of the Invention

The invention relates to an air guide device and a computer housing applying the air guide device, more particularly to an air guide device that is easy to assemble and that can be manufactured at a relatively low cost, and a computer housing applying the air guide device.

2. Description of the Related Art

As shown in FIG. 1, a conventional air guide device 1 which is used within a computer housing generally includes a base 11 and an air guide duct 12 fitted on the base 11. The base 11 has a base body 111 fastened to an inner side of a side panel 10 of the computer housing by screws. The base body 111 is integrally formed with a hollow post 112 projecting therefrom at a position corresponding to an air vent unit 101 in the side panel 10 for fitting of a hollow tubular body 121 of the air guide duct 12. The tubular body 121 is slidable relative to the post 112 to adjust an extended length of the tubular body 121 relative to the post 112 such that a hood 122 at a top end of the tubular body 121 is registered with a central processing unit (not shown) within the computer housing for exhausting heat generated by the central processing unit to the outside of the computer housing by means of a fan (not shown) on the central processing unit.

Since the market of computer housings is highly competitive and the profits are marginal, how to lower costs is an important subject. However, as the base 11 and the air guide duct 12 of the air guide device 1 are both formed by injection molding using a plastic material, not only is the manufacturing cost high, but the cost of packaging and transport before assembly is also increased due to the fixed sizes of the base 11 and the air guide duct 12.

SUMMARY OF THE INVENTION

Therefore, the object of the present invention is to provide an air guide device that is compact and easy to assemble, and that can reduce manufacturing, packaging and transport costs.

Another object of the present invention is to provide a computer housing having an air guide device, which is compact and easy to assemble, and which can reduce manufacturing, packaging and transport costs.

Accordingly, an air guide device of the present invention is to be disposed on a side panel of a computer housing, and includes an air guide member and a positioning mechanism.

The air guide member includes a first coupling portion and a second coupling portion disposed opposite to the first coupling portion and disposed to be coupled to the first coupling portion. The positioning mechanism includes at least one positioning member for coupling a bottom portion of the air guide member to the side panel. The air guide member is convertible between a state of use where the air guide member is in the form of a hollow cylinder and the first coupling portion is coupled to the second coupling portion, and an unfurled state where the air guide member is in the form of a flat sheet and the first coupling portion is separated from the second coupling portion.

In the air guide device of the present invention, the air guide member is formed from a flexible polyester material, and further includes a plurality of height adjusting portions provided at a top portion thereof for tearing therefrom, a plurality of tear lines provided among the height adjusting portions, a guide tab on a same side as the first coupling portion, and a guide hole on a same side as the second coupling portion for extension of the guide tab therethrough. Each of the height adjusting portions is tearable along a corresponding one of the tear lines so as to adjust the height of the air guide member. In addition, the first coupling portion is an engaging tab formed integrally with one side of the air guide member, whereas the second coupling portion is a retaining hole formed in the other side of the air guide member for retaining the engaging tab. The first coupling portion has two barbs disposed at two opposite sides of the first coupling portion to abuttingly engage edges of a wall defining the retaining hole.

The positioning mechanism further includes a plurality of third coupling portions that are disposed spacedly and angularly on the bottom portion of the air guide member, and a plurality of fourth coupling portions that are disposed spacedly and angularly on the positioning member for coupling to the third coupling portions, respectively. The positioning member has two spaced-apart concentric positioning rings projecting from one side thereof. The fourth coupling portions are disposed between the two positioning rings.

In an embodiment of the present invention, each of the third coupling portions is a horizontal L-shaped positioning hole formed in the air guide member, and has an alignment hole portion and a retaining hole portion extending horizontally from one side of the alignment hole portion proximate to a top end thereof. Each of the fourth coupling portions is an inverted L-shaped positioning hook projecting from one side of the positioning member, and has a base projecting from the positioning member, and a retaining block projecting from an outer side of the base proximate to a top end thereof for engaging the retaining hole portion of the respective third coupling portion.

In another embodiment of the present invention, each of the third coupling portions is a positioning tab extending from a bottom end of the air guide member. Each of the fourth coupling portions is a positioning hole formed in the positioning member for extension of the respective positioning tab therethrough.

In a further embodiment of the present invention, each of the third coupling portions is a substantially rectangular positioning hole formed in the air guide member. Each of the fourth coupling portions is a positioning hook projecting from a wall surface of a positioning ring for engaging the respective positioning hole.

On the other hand, the arrangement of the positioning mechanism can have different designs. The positioning mechanism can include two positioning members for coupling the bottom portion of the air guide member to the side panel. The positioning members have a plurality of through holes. The positioning mechanism further includes a plurality of positioning posts extending through the through holes, and a plurality of positioning pins adapted to extend through the side panel to engage the positioning posts.

In one embodiment of the present invention, the positioning members each have one end connected to the bottom portion of the air guide member, and the air guide member further includes two slots formed in the bottom portion of the air guide member for retaining the other ends of the two positioning members such that when the air guide member is in a state of use, the positioning members overlap and intersect each other, and the other ends of the two positioning members are retained in the two slots, and such that when the air guide member is in the unfurled state, the two positioning members are spaced a certain distance apart from each other, and the two positioning members are disengaged from the two slots. In addition, the positioning members each have a connecting portion connected to the bottom portion of the air guide member, and an engaging portion engaging a corresponding one of the slots. The engaging portion has two barbs disposed opposite to each other and abuttingly engaging edges of a wall defining the corresponding one of the slots.

In another embodiment of the present invention, the air guide member further includes four slots formed in the bottom portion thereof. The positioning members are removably connected to the air guide member. The positioning members each have two engaging portions disposed respectively at distal ends thereof. Each of the engaging portions includes two barbs disposed opposite to each other and abuttingly engaging edges of a wall defining the corresponding one of the slots.

In the air guide device of the present invention, manufacture of the air guide member does not require preparation of molds for injection molding, thereby reducing the manufacturing costs considerably. Besides, the air guide member is convertible between an unfurled state of a flat sheet and a state of use in the form of a hollow cylinder. Therefore, the air guide member can be packaged in the unfurled state in the form of a flat sheet before assembly, which not only reduces the size for packaging but also lowers packaging and transport costs.

BRIEF DESCRIPTION OF THE DRAWINGS

Other features and advantages of the present invention will become apparent in the following detailed description of the preferred embodiments with reference to the accompanying drawings, of which:

FIG. 13 is a front view of an air guide member of the fourth preferred embodiment of an air guide device according to the present invention, showing that the air guide member is in an unfurled state, and connecting portions of a positioning member are spaced a certain distance from a bottom end of a guide body of the air guide member;

FIG. 14 is a perspective view to illustrate how the air guide member of the fourth preferred embodiment is converted to a state of use;

DETAILED DESCRIPTION OF THE PREFERRED EMBODIMENTS

Figure 1:
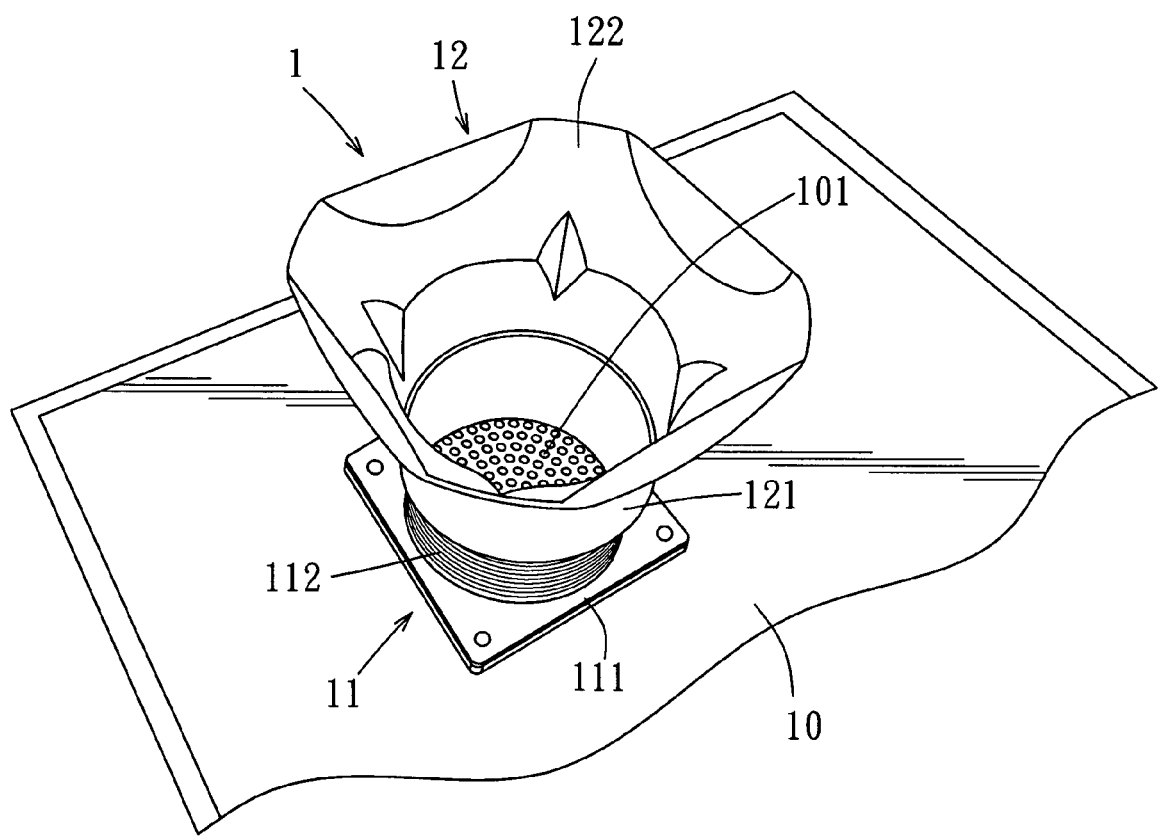
FIG. 1 is a perspective view of a conventional air guide device disposed on a side panel.

Before the present invention is described in greater detail, it should be noted that like elements are denoted by the same reference numerals throughout the disclosure.

Figure 2:
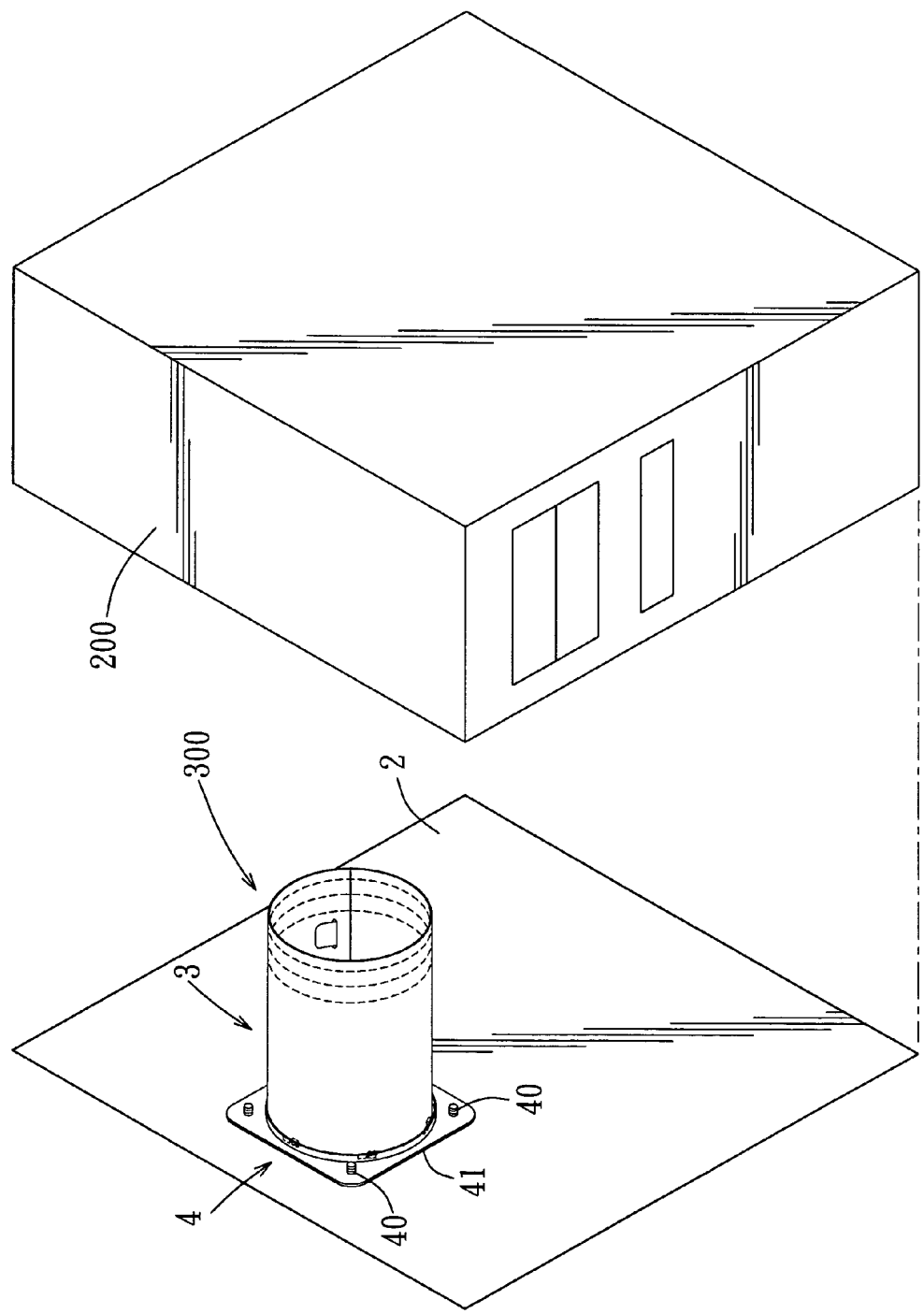
FIG. 2 is an exploded perspective view showing the first preferred embodiment of an air guide device disposed on a side panel of a computer housing.
Figure 3:
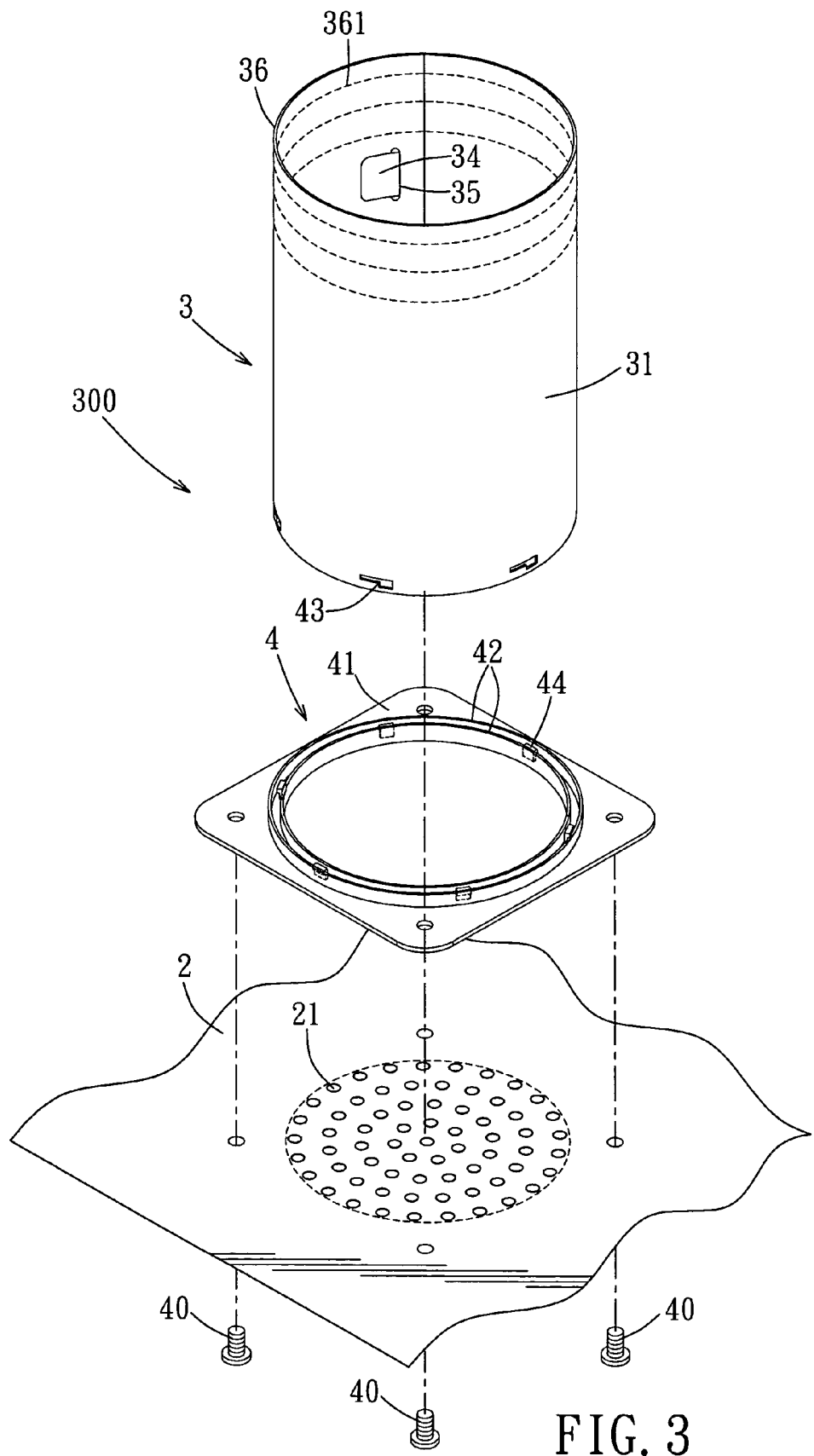
FIG. 3 is an exploded perspective view of the first preferred embodiment to illustrate the arrangement relationship among an air guide member, a positioning member, and the side panel.

FIGS. 2 and 3 show the first preferred embodiment of an air guide device 300 according to the present invention. The air guide device 300 is suitable for mounting on a side panel 2 of a computer housing 200. The side panel 2 is provided with a plurality of air vents 21. The air guide device 300 includes an air guide member 3 corresponding in position to the air vents 21, and a positioning mechanism 4 for positioning the air guide member 3 on the side panel 2.

Hereinbelow, the direction to which a top face of the side panel 2 is oriented is referred to as the upper side, and the direction opposite to the upper side is referred to as the lower side.

Figure 4:
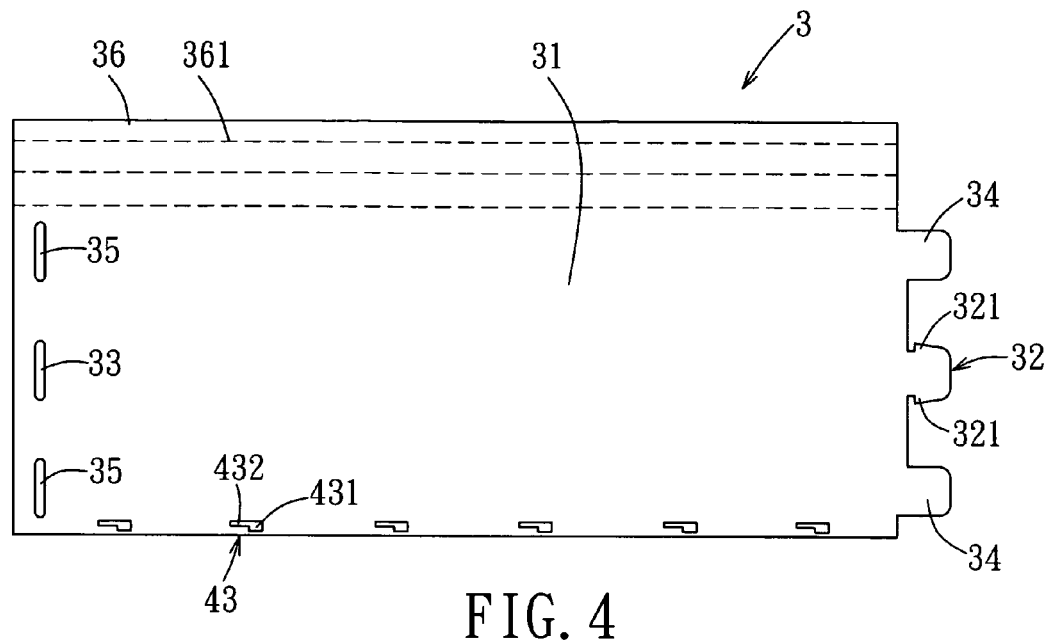
FIG. 4 is a front view to illustrate the air guide member of the first preferred embodiment in an unfurled state.

As shown in FIGS. 3 and 4, the air guide member 3 is a flexible sheet of Mylar™, which is a kind of polyester material. The air guide member 3 includes a substantially rectangular guide body 31. A right lateral edge of the guide body 31 is provided with a first coupling portion 32 projecting therefrom, whereas a left lateral edge of the guide body 31 is provided with a second coupling portion 33 for coupling to the first coupling portion 32. In this embodiment, the first coupling portion 32 is an engaging tab that is formed integrally with the guide body 31. Upper and lower sides of the first coupling portion 32 are each provided with a barb 321. The second coupling portion 33 is a retaining hole for engaging the first coupling portion 32. A longitudinal length of the first coupling portion 32 from the upper side to the lower side is slightly greater than that of the second coupling portion 33 such that the barbs 321 of the first coupling portion 32 can abuttingly engage edges of a wall defining the retaining hole. The right lateral edge of the guide body 31 is further provided with two guide tabs 34 that project outwardly therefrom and that are disposed apart from each other above and below the first coupling portion 32, respectively. The guide body 31 is further provided with two guide holes 35 that are formed adjacent to the left lateral edge and that are disposed apart from each other above and below the second coupling portion 33, respectively, each for extension of the corresponding guide tab 34 therethrough. The arrangement of the guide tabs 34 and the guide holes 35 can assist in accurate alignment and hence coupling of the first coupling portion 32 with the second coupling portion 33. It is noted that each of the guide tabs 34 can also be configured to have barbs like the barbs 321 of the first coupling portion 32 so as to engage the corresponding guide hole 35.

That is, the present invention is not limited to the arrangement of barbs only on the first coupling portion 32 in this embodiment.

In addition, as the design of the computer housing 200 (see FIG. 2) may vary, the size of the space from the side panel 2 to the central processing unit (not shown) may vary as well. Therefore, the air guide member 3 further includes a plurality of interconnected height adjusting portions 36 at a top end of the guide body 31. A tear line 361, which is formed by intermittent cutting using a molding tool (not shown), is present between every two adjacent height adjusting portions 36 to facilitate optional tearing of the height adjusting portion (s) 36 along the tear line(s) 361 by the user for adjusting the air guide member 3 to the desired height.

Figure 5:
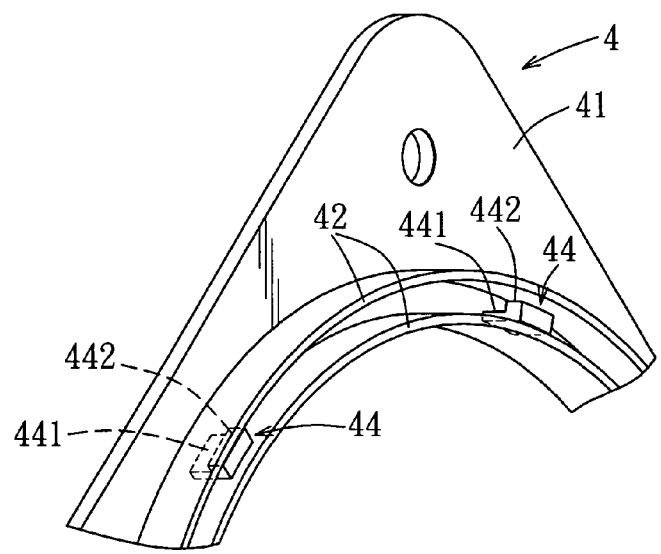
FIG. 5 is a fragmentary enlarged perspective view to illustrate a positioning mechanism of the first preferred embodiment.

As shown in FIGS. 3, 4 and 5, the positioning mechanism 4 includes a substantially square-shaped hollow positioning member 41 formed from a plastic material for coupling with the side panel 2. An upper surface of the positioning member 41 has two spaced-apart concentric positioning rings 42 projecting upwardly therefrom. The air guide member 3 further includes a plurality of third coupling portions 43 that are disposed spacedly on the guide body 31 of the air guide member 3 proximate to a bottom end thereof, and the positioning mechanism 4 further includes a plurality of fourth coupling portions 44 that project from the upper surface of the positioning member 41 and that are disposed between the two positioning rings 42. The aforesaid third coupling portions 43 are engageable with the fourth coupling portions 44 so as to position the air guide member 3 on the positioning member 41. In this embodiment, each of the third coupling portions 43 is a substantially horizontal L-shaped positioning hole, which has an alignment hole portion 431 and a retaining hole portion 432 extending horizontally leftward from a left side of the alignment hole portion 431 proximate to a top end thereof. A longitudinal length of the retaining hole portion 432 from the upper side to the lower side is shorter than that of the alignment hole portion 431. Each of the fourth coupling portions 44 is an inverted L-shaped positioning hook, which has a hook base 441 projecting from the upper surface of the positioning member 41, and a retaining block 442 projecting outward from an outer side of the hook base 441 proximate to a top end thereof for engaging the retaining hole portion 432 of the respective third coupling portion 43.

Figure 6:
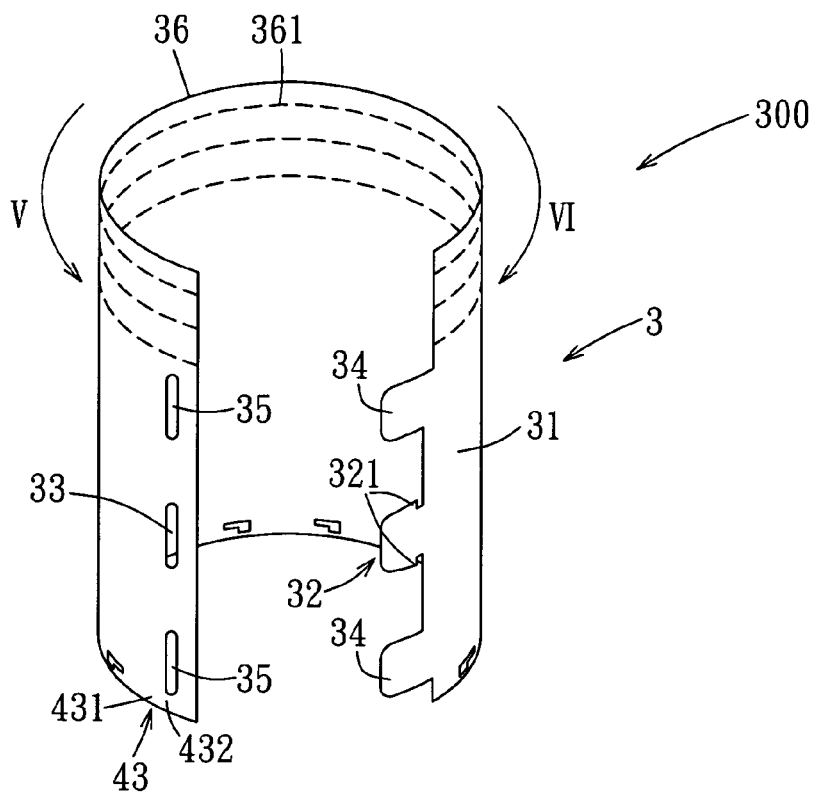
FIG. 6 is a perspective view to illustrate how the air guide member of the first preferred embodiment is converted to a state of use.
Figure 7:
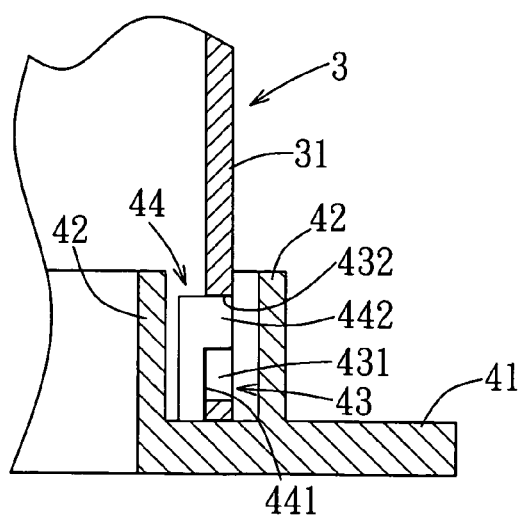
FIG. 7 is a fragmentary enlarged sectional view of the first preferred embodiment, showing how a retaining block of a fourth coupling portion is retained in a retaining hole of a third coupling portion.
Figure 8:
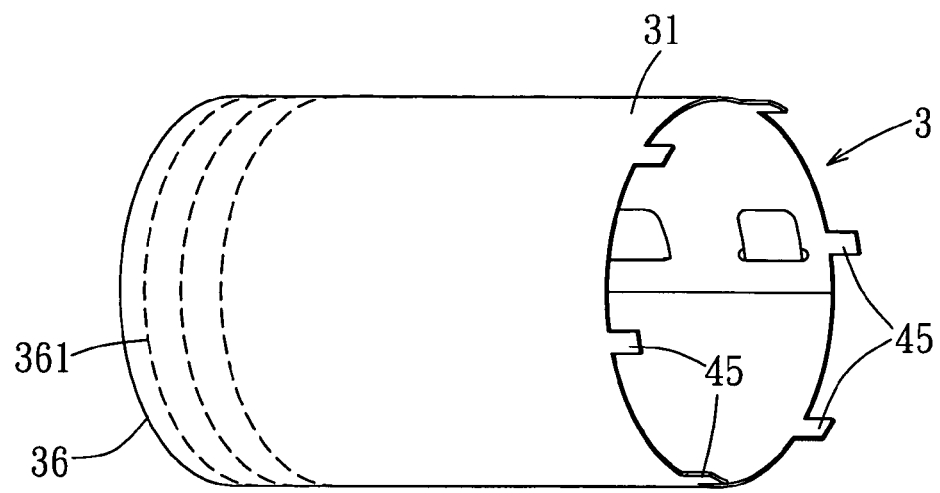
FIG. 8 is a perspective view of an air guide member of the second preferred embodiment of an air guide device according to the present invention.
Figure 9:
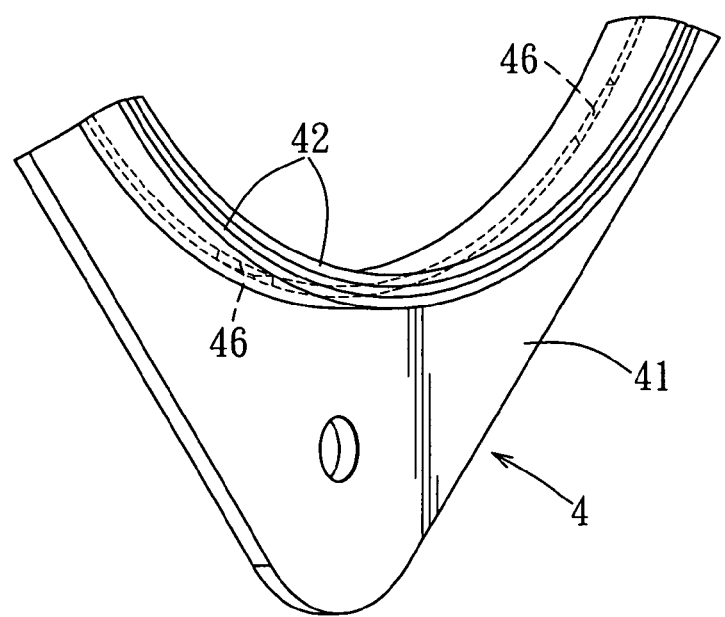
FIG. 9 is a fragmentary enlarged perspective view to illustrate a positioning mechanism of the second preferred embodiment.
Figure 10:
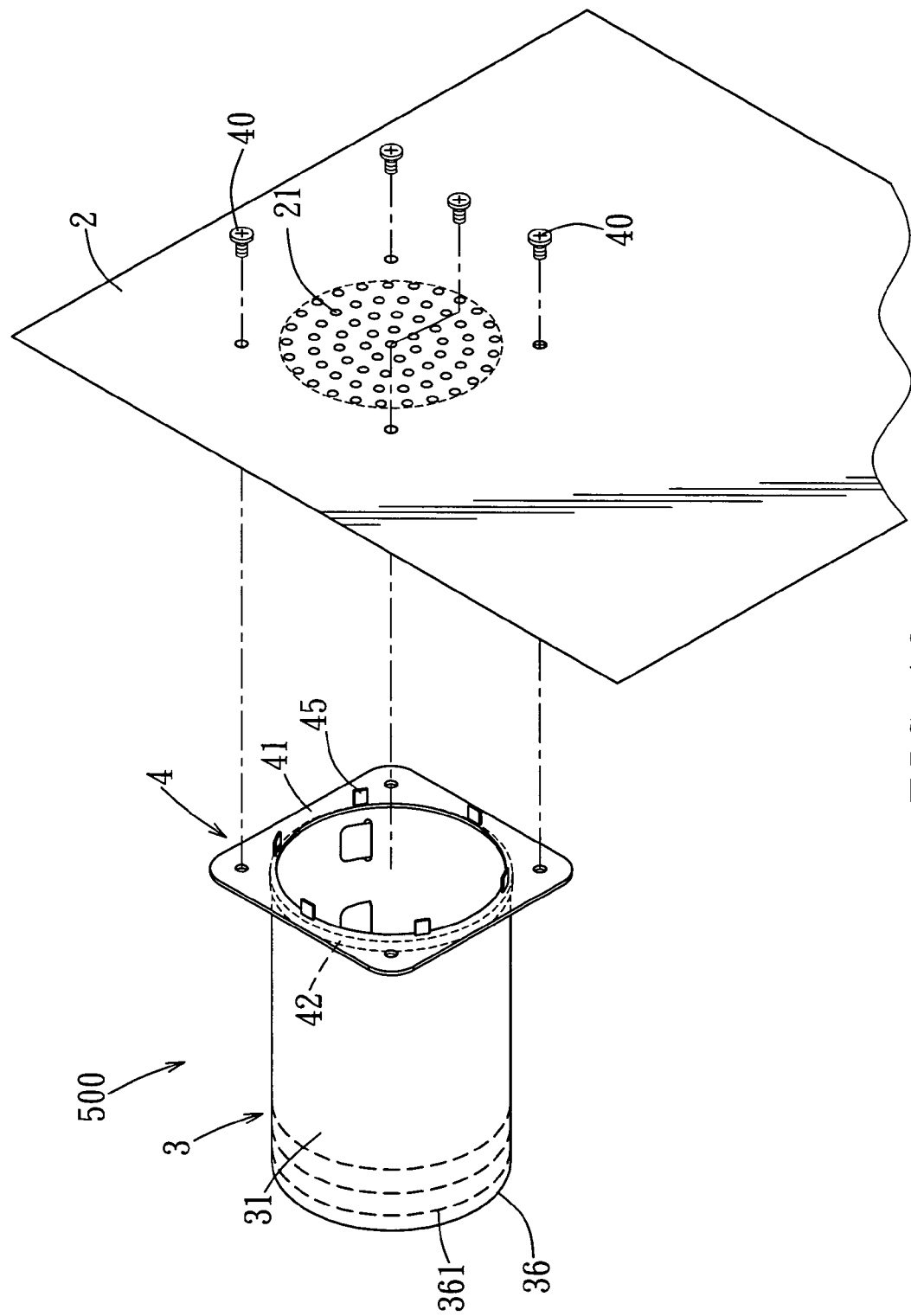
FIG. 10 is an exploded perspective view showing the second preferred embodiment and a side panel.
Figure 11:
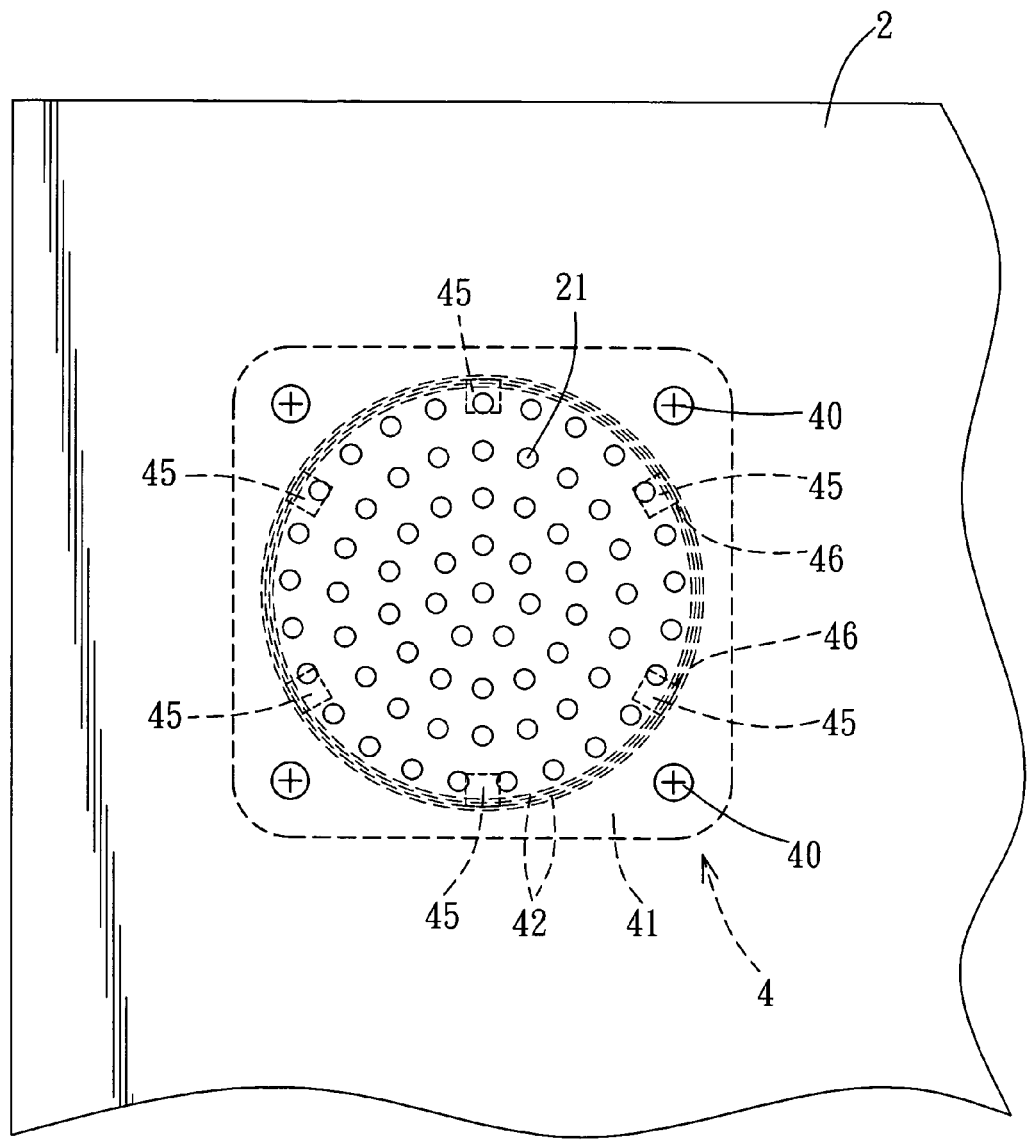
FIG. 11 is a fragmentary enlarged schematic view showing the second preferred embodiment disposed on the side panel.

Referring to FIG. 6, when assembling the air guide device 300, left and right sides of the air guide member 3 being in the form of a flat sheet are respectively bent inward in directions indicated by arrows V and VI, respectively, and the guide tabs 34 are extended correspondingly through the guide holes 35, with the barbs 321 of the first coupling portion 32 retained by the second coupling portion 33. At this time, the air guide member 3 is in a state of use in the form of a hollow cylinder. Then, as shown in FIG. 7, the air guide member 3 is fitted between the two positioning rings 42 of the positioning member 41, with the alignment hole portion 431 of each third coupling portion 43 corresponding to the retaining block 442 of the respective fourth coupling portion 44. When a bottom end of the air guide member 3 abuts against the upper surface of the positioning member 41, and the retaining block 442 of the fourth coupling portion 44 is extended through the alignment hole portion 431 of the respective third coupling portion 43 close to the top end thereof, the air guide member 3 is rotated a suitable angle in a direction opposite to the retaining hole portions 432 of the third coupling portions 43 such that the retaining block 442 of each fourth coupling portion 44 is retained in the retaining hole portion 432 of the respective third coupling portion 43, i.e., the air guide member 3 is secured on the positioning member 41, thereby accomplishing assembly of the air guide device 300. As shown in FIG. 3, using a plurality of screws 40, the positioning member 41 can be screwably locked to an inner side of the side panel 2 so that the air guide device 300 is secured on the side panel 2 with one end of the air guide member 3 corresponding to the air vents 21 in the side panel 2, and with the other end of the air guide member 3 corresponding to the central processing unit (not shown) within the computer housing 200. By means of a heat dissipating fan (not shown) on the central processing unit (not shown), the heat generated by the central processing unit can be discharged to the outside of the computer housing 200 through the air guide device 300.

Since the manufacture of the air guide member 3 does not require plastic injection molding, the manufacturing cost can be reduced considerably. Besides, since the air guide member 3 is convertible between an unfurled state of a flat sheet and a state of use in the form of a hollow cylinder, the air guide member 3 can be packaged and transported in the unfurled state before assembly, which not only reduces the size for packaging but also lowers packaging and transport costs. Furthermore, as the positioning mechanism 4 does not have a height adjusting design for adjusting the height of the air guide member 3, the height of the positioning mechanism 4 can be reduced to further lower the packaging and transport costs. In addition, due to the arrangement of the height adjusting portions 36, the user can adjust the height of the air guide member 3 depending on the size of the space available in the computer housing 200.

FIGS. 8, 9, 10 and 11 show the second preferred embodiment of an air guide device 500 according to the present invention. The air guide device 500 is substantially similar to the air guide device 300 of the first preferred embodiment in overall construction. However, the construction and arrangement of the third coupling portions 45 of the air guide member 3 and the fourth coupling portions 46 of the positioning mechanism 4 in this embodiment are different compared with the first preferred embodiment.

In this embodiment, each third coupling portion 45 is a positioning tab extending integrally and downwardly from a bottom end of the guide body 31 of the air guide member 3, whereas each fourth coupling portion 46 is a positioning hole formed in the positioning member 41 and disposed between the two positioning rings 42 for extension of the respective positioning tab therethrough. During assembly, the air guide member 3 in the form of a hollow cylinder is fitted between the two positioning rings 42 of the positioning member 41, and the third coupling portions 45 of the air guide member 3 are extended through the fourth coupling portions 46 of the positioning member 41, with the third coupling portions 45 exposed from the bottom side of the positioning member 41. The positioning member 41 is locked to the side panel 2 by means of screws 40. At this time, since the material of the third coupling portions 45 is thin and soft, after the positioning member 41 is locked to the side panel 2, the third coupling portions 45 are compressed so that the third coupling portions 45 bend naturally and are sandwiched between the positioning member 41 and the side panel 2. Thus, the air guide member 3 can be positioned firmly on the positioning member 41.

Figure 12:
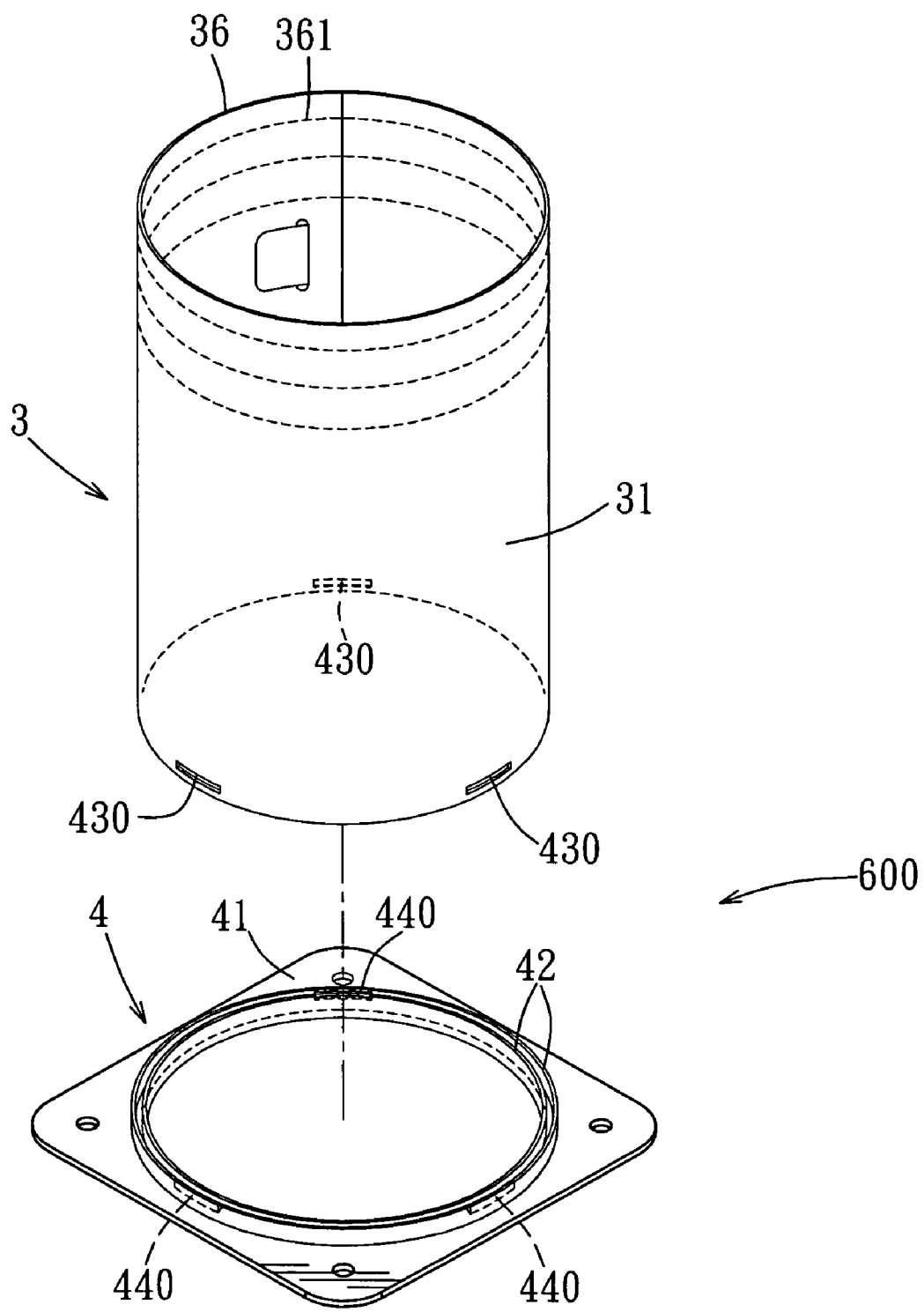
FIG. 12 is a perspective view of an air guide member of the third preferred embodiment of an air guide device according to the present invention.
Figure 15:
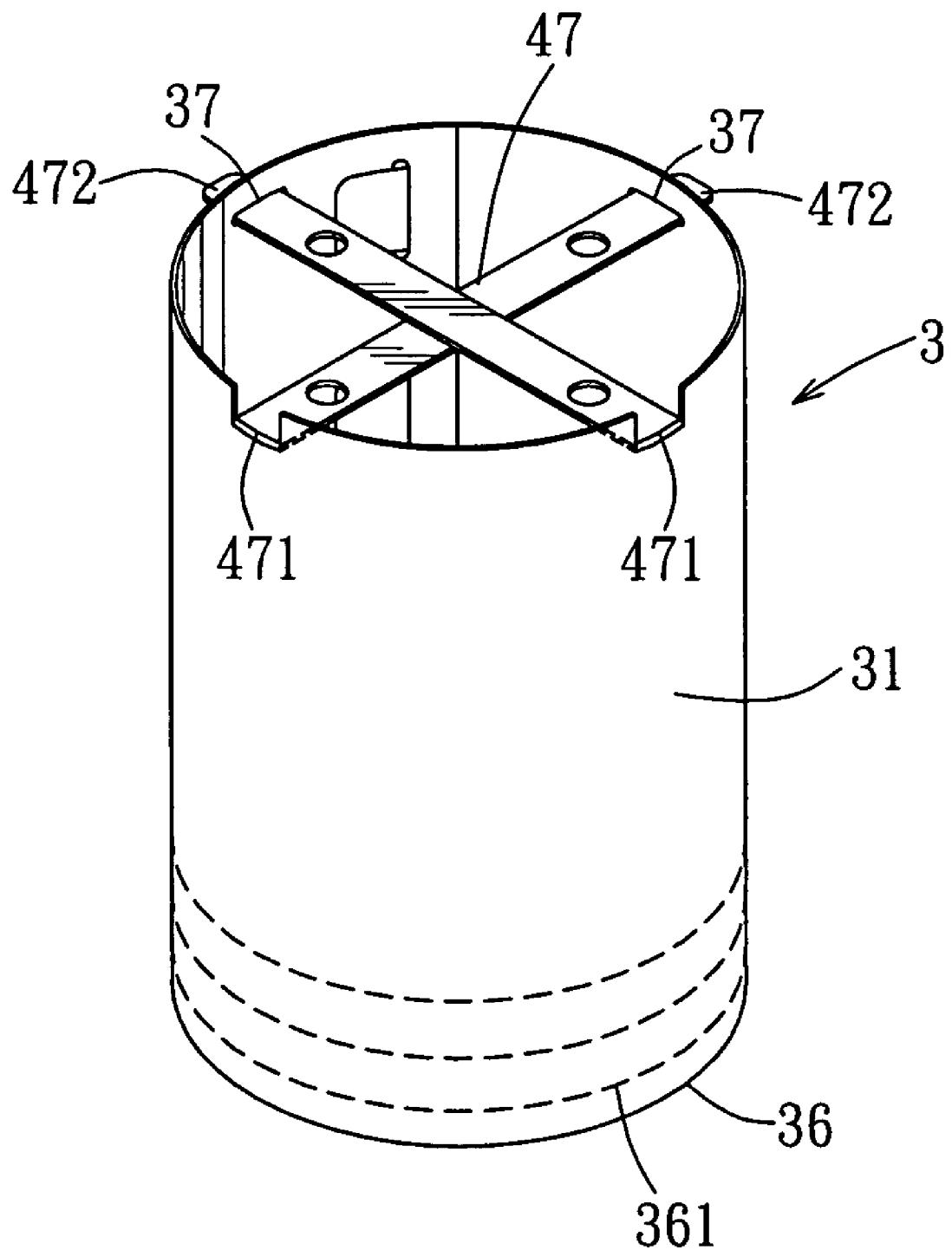
FIG. 15 is a perspective view of the air guide member of the fourth preferred embodiment.
Figures 16, 17:
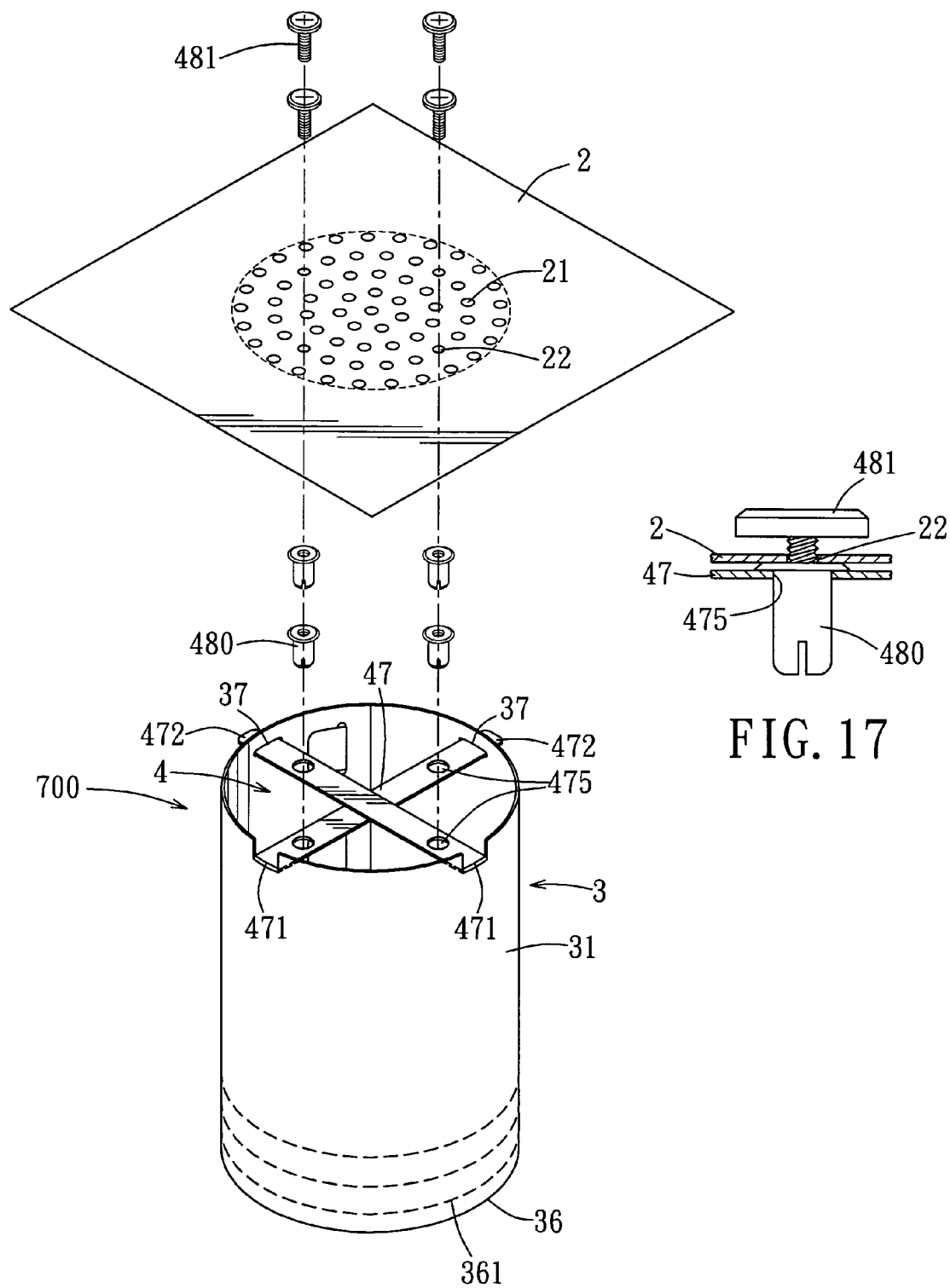
FIG. 16 is an exploded perspective view showing the fourth preferred embodiment and a side panel.
FIG. 17 is a fragmentary enlarged partly sectional view of the fourth preferred embodiment, showing the positioning member coupled to the side panel through a positioning post and a positioning pin.

FIG. 12 shows the third preferred embodiment of an air guide device 600 according to the present invention. The air guide device 600 is substantially similar to the air guide device 300 of the first preferred embodiment. However, the constructions of the third coupling portions 430 of the air guide member 3 and the fourth coupling portions 440 of the positioning mechanism 4 are slightly different compared with the first preferred embodiment.

In this embodiment, each third coupling portion 430 is a substantially rectangular positioning hole, whereas each fourth coupling portion 440 is a positioning hook projecting from an inner wall surface of the outer positioning ring 42. During assembly, the hollow cylindrical air guide member 3 is fitted between the two positioning rings 42. Since the air guide member 3 is formed from a flexible material, when the fourth coupling portions 440 come into contact with an outer peripheral surface of the air guide member 3, the air guide member 3 will be pressed inward, and will resume its original shape by virtue of the resilience thereof after the fourth coupling portions 440 engage the third coupling portions 430, thereby enabling the air guide member 3 to be positioned firmly on the positioning member 41.

FIGS. 13 to 16 show the fourth preferred embodiment of an air guide device 700 according to the present invention. The air guide device 700 is substantially similar to the air guide device 300 of the first preferred embodiment in overall construction. However, the construction and arrangement of the positioning members 47 of the air guide member 3 are different compared with the first preferred embodiment.

In this embodiment, a bottom portion of the air guide member 3 is provided with two spaced-apart elongated positioning members 47. Each of the positioning members 47 has a connecting portion 471 connected to the bottom portion of the guide body 31 of the air guide member 3, and an engaging portion 472 provided at a distal end thereof. The connecting portion 471 is spaced a certain distance apart from the bottom edge of the guide body 31, and the connecting portion 471 is a fold line. Left and right sides of the positioning member 47 adjacent to the connecting portion 471 are respectively formed with slits 473 extending from the connecting portion 471 to the bottom edge of the guide body 31 such that the positioning member 47 can be bent relative to the guide body 31 of the air guide member 3 at the connecting portion 471. In addition, the guide body 31 of the air guide member 3 adjacent to the bottom end thereof is provided with two slots 37 that are respectively formed in outer sides of the positioning members 47. The slots 37 are disposed to engage barbs 474 of the engaging portions 472, respectively.

Referring to FIGS. 14, 15, 16 and 17, during assembly, the air guide member 3 is bent into a hollow cylindrical shape and then turned 180 degrees. The two positioning members 47 are bent relative to the guide body 31 along the connecting portions 471 in sequence, and the engaging portions 472 are respectively extended through the slots 37 such that the barbs 474 of the engaging portions 472 are retained by the slots 37. At this time, the two positioning members 47 overlap and intersect each other. Next, a plurality of positioning posts 480 of the positioning mechanism 4 are extended respectively through a plurality of through holes 475 in the positioning members 47 so as to bring the positioning posts 480 to abut against the positioning members 47. A plurality of positioning pins 481 are also extended respectively through a plurality of openings 22 in the side panel 2 to be inserted into and threadedly engaged in the corresponding positioning posts 480, thereby positioning the air guide member 3 on the side panel 2.

Figure 18:
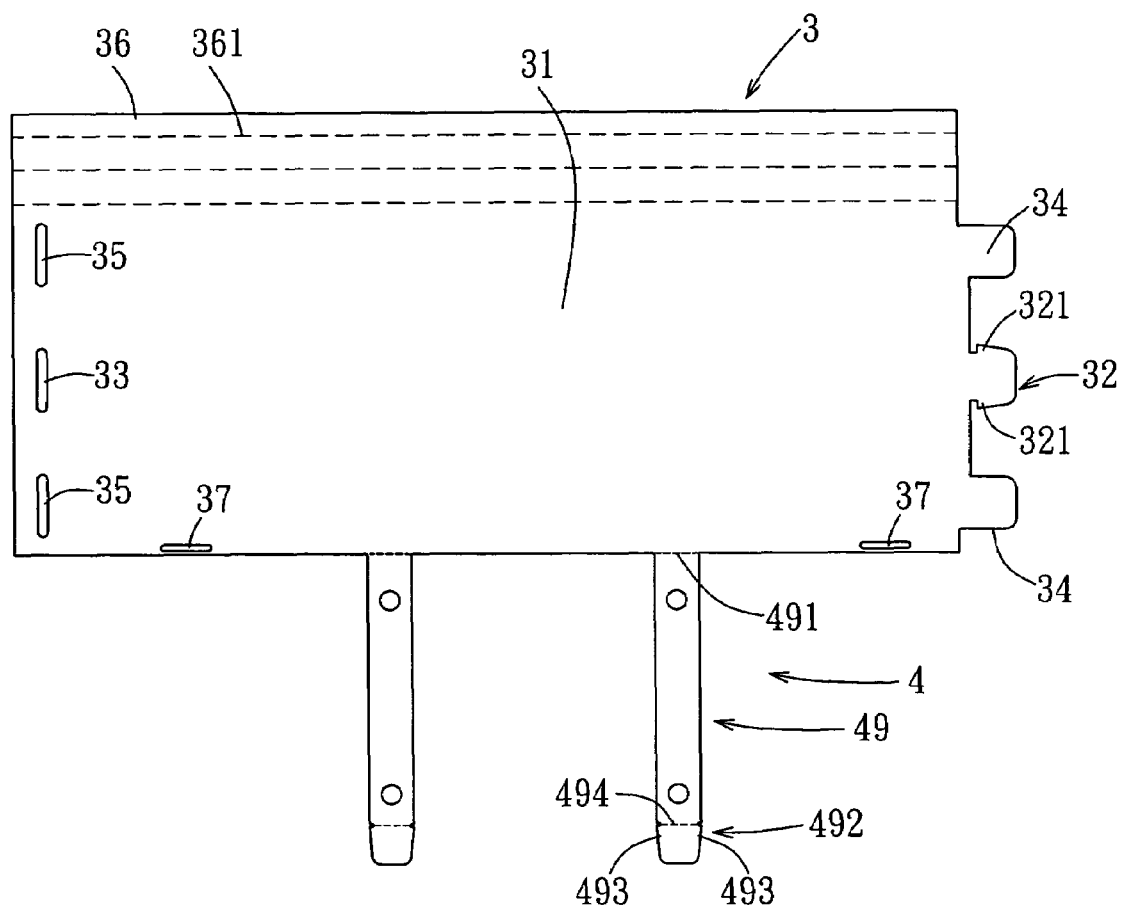
FIG. 18 is a front view of an air guide member of the fifth preferred embodiment of an air guide device according to the present invention, showing that the air guide member is in an unfurled state and connecting portions of a positioning member are flush with a bottom end of a guide body of the air guide member.
Figure 19:
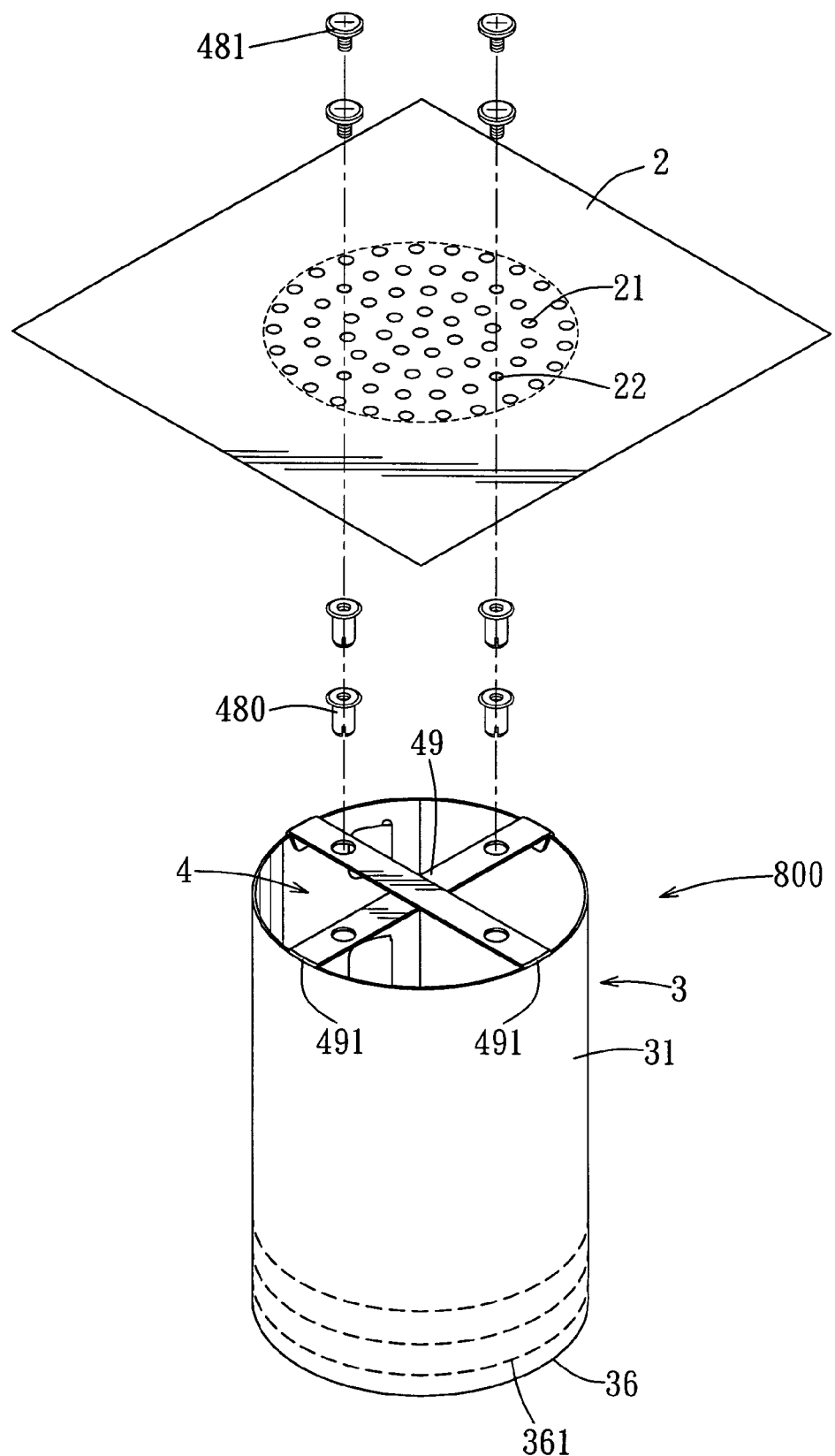
FIG. 19 is an exploded perspective view showing the fifth preferred embodiment of an air guide device and a side panel.

FIGS. 18 and 19 show the fifth preferred embodiment of an air guide device 800 according to the present invention. The air guide device 800 is substantially similar to the air guide device 700 of the fourth preferred embodiment in overall construction. However, the construction of the positioning members 49 of the positioning mechanism 4 is slightly different compared with the fourth preferred embodiment.

The connecting portion 491 of each positioning member 49 is flush with the bottom edge of the guide body 31 of the air guide member 3, and each positioning member 49 is provided with a fold line 494 adjacent to the engaging portion 492 such that the engaging portion 492 can be bent along the fold line 494. During assembly, since the positioning members 49 are flush with the bottom edge of the guide body 31 after bending, it is necessary to bend each engaging portion 492 along the respective fold line 494 in the direction of the respective slot 37 and then extend each engaging portion 492 through the respective slot 37 from the outer side of the guide body 31 of the air guide member 3 such that the barbs 493 of the engaging portion 492 are retained by the respective slot 37. By means of the arrangement of the positioning posts 480 and the positioning pins 481, the air guide member 3 can be positioned on the side panel 2.

Figure 20:
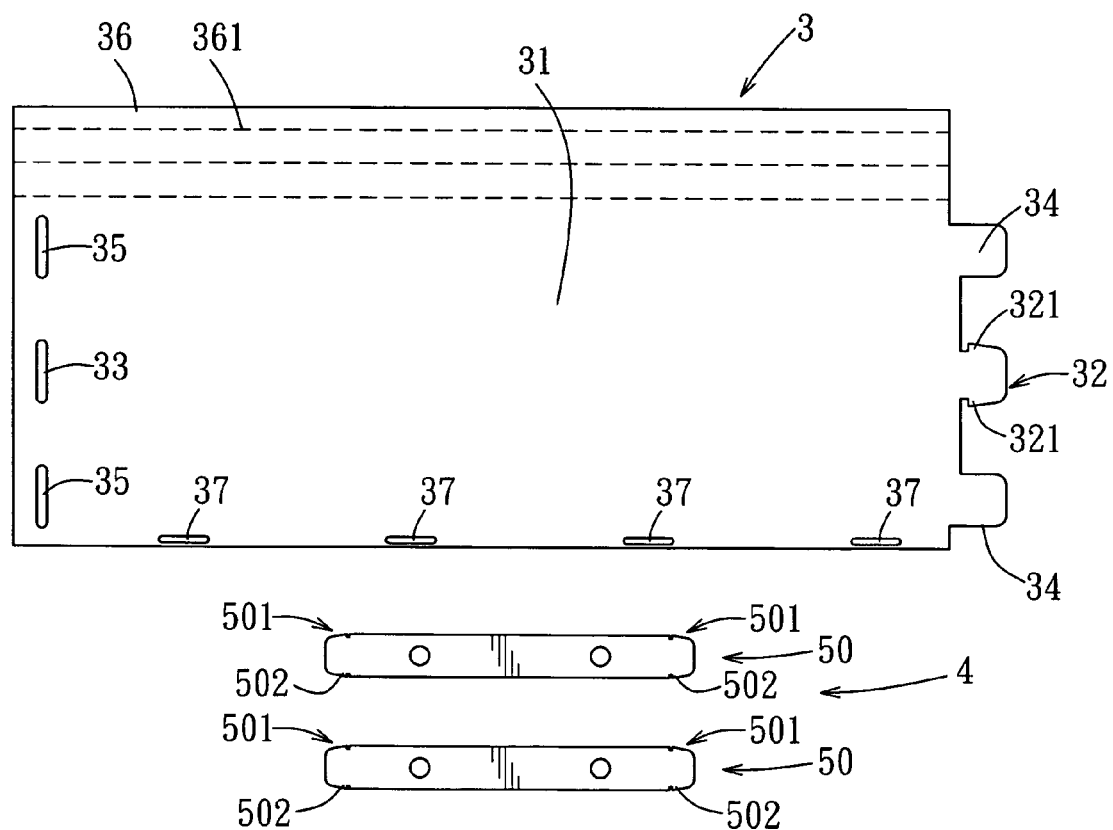
FIG. 20 is a front view of an air guide member of the sixth preferred embodiment according to the present invention, showing the arrangement relationship between the air guide member and a positioning member.
Figure 21:
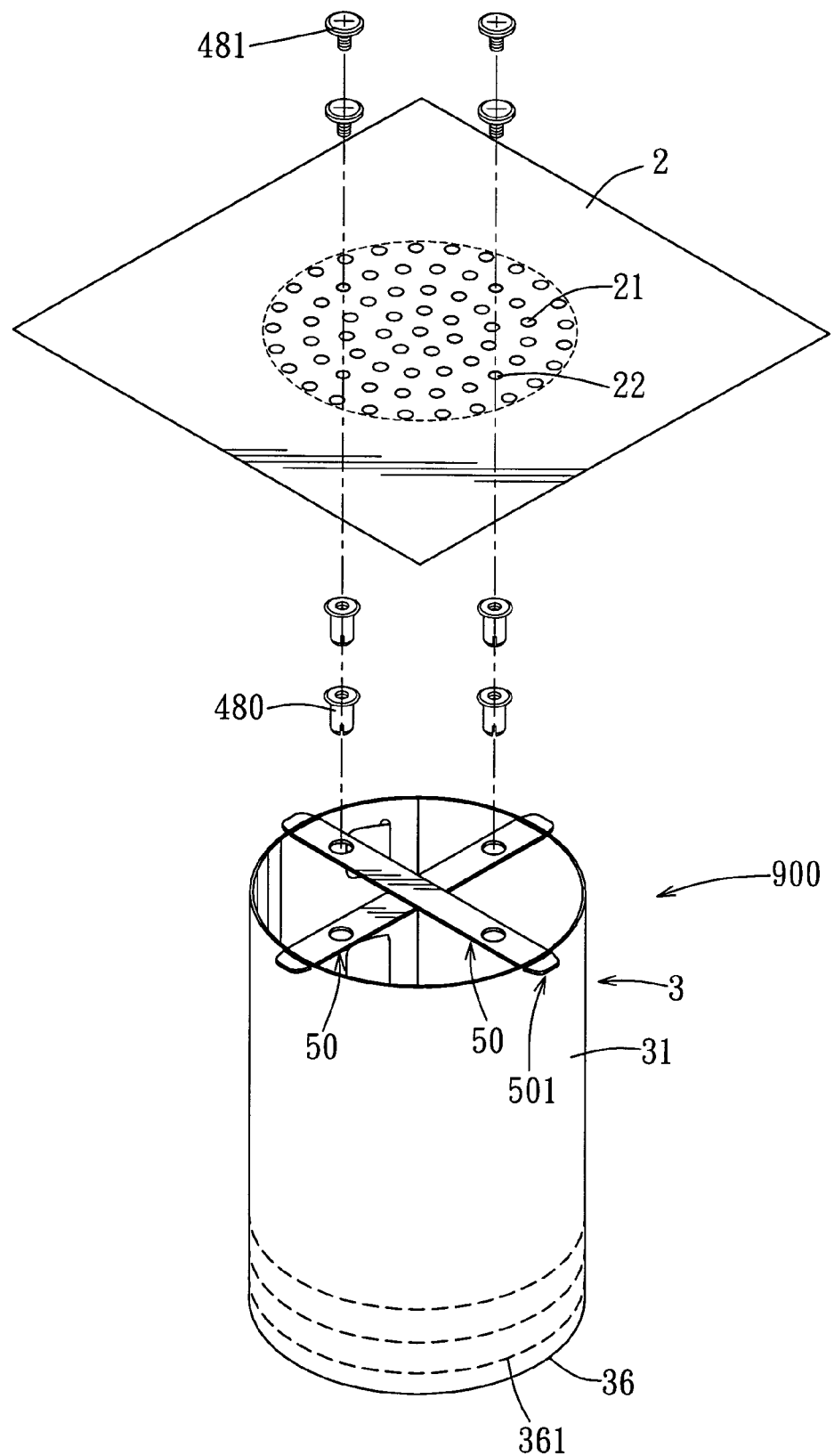
FIG. 21 is an exploded perspective view showing the sixth preferred embodiment and a side panel.

FIGS. 20 and 21 show the sixth preferred embodiment of an air guide device 900 according to the present invention. The air guide device 900 is substantially similar to the air guide device 800 of the fifth preferred embodiment, except that the construction of the positioning members 50 of the positioning mechanism 4 is slightly different compared with the fifth preferred embodiment.

The guide body 31 of the air guide member 3 is provided with four spaced-apart slots 37 adjacent to the bottom edge thereof. Each of the positioning members 50 is a strip that is removably connected to the air guide member 3, and has two ends respectively provided with engaging portions 501. During assembly, the two engaging portions 501 of the positioning member 50 are extended through the respective slots 37 from the inner side of the hollow cylindrical air guide member 3 such that the barbs 502 of the engaging portions 501 are retained at the outer sides of the corresponding slots 37, thereby assembling the positioning member 50 on the air guide member 3.

Figure 22:
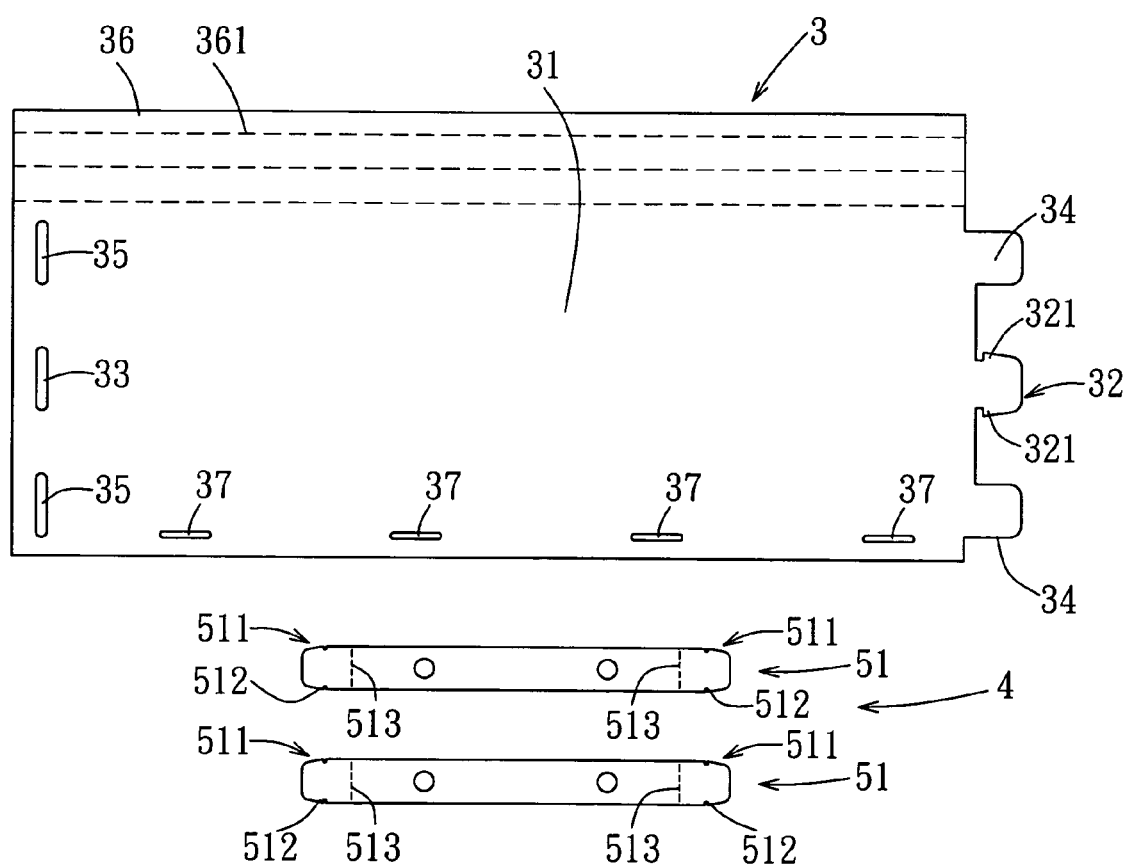
FIG. 22 is a front view of the seventh preferred embodiment of an air guide member and a positioning member according to the present invention, illustrating the arrangement relationship between the air guide member and the positioning member.
Figure 23:
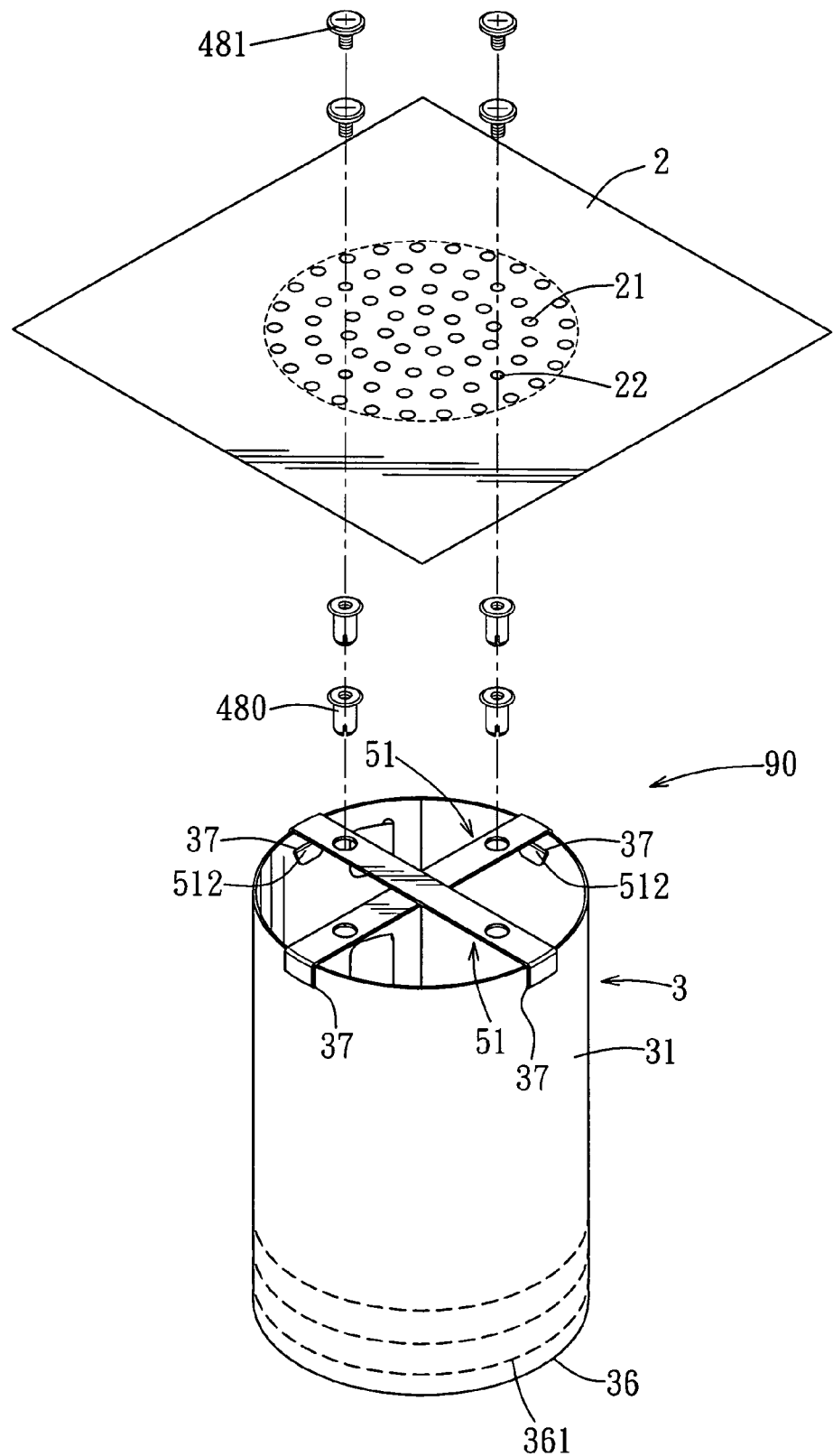
FIG. 23 is an exploded perspective view showing the seventh preferred embodiment and a side panel.

FIGS. 22 and 23 show the seventh preferred embodiment of an air guide device 90 according to the present invention. The air guide device 90 is substantially similar to the air guide device 900 of the sixth preferred embodiment in overall construction, except that the construction and manner of assembly of the positioning members 51 of the positioning mechanism are slightly different compared with the sixth preferred embodiment.

Each of the positioning members 51 is provided with two fold lines 513 disposed inwardly of the corresponding engaging portions 511. During assembly, the positioning members 51 are flush with the bottom edge of the guide body 31 of the air guide member 3, and the two ends of each positioning member 51 are bent toward the direction of the corresponding slots 37 in the air guide member 3 along the corresponding fold lines 513, followed by extension of the engaging portions 511 of the positioning members 51 through the corresponding slots 37 from the outer side of the air guide member 3 such that the barbs 512 of the engaging portions 511 are retained at the inner sides of the corresponding slots 37, thereby assembling the positioning members 51 on the air guide member 3.

In sum, since the manufacture of the air guide member 3 in the above-described embodiments does not require plastic injection molding, the manufacturing costs can be reduced to a considerable extent. Besides, the air guide member 3 is convertible between an unfurled state of a flat sheet and a state of use in the form of a hollow cylinder, the air guide member 3 can be packaged and transported in the unfurled state before assembly, which not only reduces the packaging size but also lowers packaging and transport costs. On the other hand, through various arrangements of the positioning members 41, 47, 49, 50, and 51 of the positioning mechanism 4, the air guide member 3 can be coupled to the side panel 2 of the computer housing 200 in different manners, thereby enhancing the fun in assembling the present invention and achieving the objects of the present invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An air guide device adapted to be disposed on a side panel of a computer housing, said air guide device comprising:
   an air guide member including a first coupling portion and a second coupling portion disposed opposite to said first coupling portion and disposed to be coupled to said first coupling portion; and
   a positioning mechanism including at least one positioning member adapted for coupling a bottom portion of said air guide member to the side panel;
   said air guide member being convertible between a state of use where said air guide member is in the form of a hollow cylinder and said first coupling portion is coupled to said second coupling portion, and an unfurled state where said air guide member is in the form of a flat sheet and said first coupling portion is separated from said second coupling portion.

2. The air guide device according to claim 1, wherein said air guide member is formed from a flexible polyester material.

3. The air guide device according to claim 1, wherein said air guide member further includes a plurality of height adjusting portions provided at a top portion thereof for tearing therefrom, and a plurality of tear lines provided among said height adjusting portions, each of said height adjusting portions being tearable along a corresponding one of said tear lines so as to adjust height of said air guide member.

4. The air guide device according to claim 1, wherein said first coupling portion is an engaging tab formed integrally with one side of said air guide member, and said second coupling portion is a retaining hole formed in the other side of said air guide member for retaining said engaging tab.

5. The air guide device according to claim 4, wherein said first coupling portion has two barbs disposed at two opposite sides of said first coupling portion to abuttingly engage edges of a wall defining said retaining hole.

6. The air guide device according to claim 4, wherein said air guide member further includes a guide tab on a same side as said first coupling portion, and a guide hole on a same side as said second coupling portion for extension of said guide tab therethrough.

7. The air guide device according to claim 1, wherein said air guide member further includes a plurality of third coupling portions that are disposed spacedly and angularly on said bottom portion of said air guide member, and said positioning mechanism further includes a plurality of fourth coupling portions that are disposed spacedly and angularly on said positioning member for coupling to said third coupling portions, respectively.

8. The air guide device according to claim 7, wherein said positioning member has two spaced-apart concentric positioning rings projecting from one side thereof, said fourth coupling portions being disposed between said two positioning rings.

9. The air guide device according to claim 7, wherein each of said third coupling portions is a horizontal L-shaped positioning hole formed in said air guide member, each of said third coupling portions having an alignment hole portion and a retaining hole portion extending horizontally from one side of said alignment hole portion proximate to a top end thereof each of said fourth coupling portions being an inverted L-shaped positioning hook projecting from one side of said positioning member, each of said fourth coupling portions having a base projecting from said positioning member, and a retaining block projecting from an outer side of said base proximate to a top end thereof for engaging said retaining hole portion of the respective one of said third coupling portions.

10. The air guide device according to claim 7, wherein each of said third coupling portions is a positioning tab extending from a bottom end of said air guide member, each of said fourth coupling portions being a positioning hole formed in said positioning member for extension of the respective one of said positioning tabs therethrough.

11. The air guide device according to claim 8, wherein each of said third coupling portions is a substantially rectangular positioning hole formed in said air guide member, each of said fourth coupling portions being a positioning hook projecting from a wall surface of one of said positioning rings for engaging the respective one of said positioning holes.

12. The air guide device according to claim 1, wherein said positioning mechanism includes two of said positioning members adapted for coupling said bottom portion of said air guide member to the side panel, each of said positioning members having a plurality of through holes, said positioning mechanism further including a plurality of positioning posts extending through said through holes, and a plurality of positioning pins adapted to extend through the side panel to engage said positioning posts.

13. The air guide device according to claim 12, wherein said two positioning members each have one end connected to said bottom portion of said air guide member, and said air guide member further includes two slots formed in said bottom portion of said air guide member for retaining the other ends of said two positioning members such that when said air guide member is in the state of use, said positioning members overlap and intersect each other, and the other ends of said two positioning members are retained in said two slots, and such that when said air guide member is in the unfurled state, said two positioning members are spaced a certain distance apart from each other, and said two positioning members are disengaged from said two slots.

14. The air guide device according to claim 13, wherein each of said positioning members has a connecting portion connected to said bottom portion of said air guide member, and an engaging portion engaging a corresponding one of said slots, said engaging portion having two barbs disposed opposite to each other and abuttingly engaging edges of a wall defining the corresponding one of said slots.

15. The air guide device according to claim 14, wherein said connecting portion of each of said positioning members is spaced a certain distance apart from a bottom edge of said air guide member, and each of said positioning members has two slits extending respectively from two sides of said connecting portion to said bottom edge of said air guide member.

16. The air guide device according to claim 14, wherein said connecting portion of each of said positioning members is flush with a bottom edge of said air guide member, and each of said positioning members has a fold line adjacent to said engaging portion, said engaging portion of each of said positioning members being bendable along said fold line and being retained in the corresponding one of said slots.

17. The air guide device according to claim 12, wherein said air guide member further includes four slots formed in said bottom portion of said air guide member, each of said positioning members being removably connected to said air guide member, each of said positioning members having two engaging portions disposed respectively at distal ends thereof, each of said engaging portions including two barbs disposed opposite to each other and abuttingly engaging edges of a wall defining the corresponding one of said slots.

18. The air guide device according to claim 17, wherein said two positioning members overlap and intersect each other and are spaced a certain distance apart from a bottom edge of said air guide member.

19. The air guide device according to claim 17, wherein said two positioning members overlap and intersect each other, and are flush with a bottom edge of said air guide member, each of said positioning members having two fold lines respectively adjacent to said two engaging portions, said engaging portions of each of said positioning member being bendable along said fold lines and being retained in corresponding ones of said slots.

20. A computer housing having an air guide device, comprising:
  a side panel having a plurality of air vents;
  an air guide device disposed on an inner side of said side panel, said air guide device including:
    an air guide member, said air guide member having a bottom portion corresponding to said air vents in said side panel, and including a first coupling portion and a second coupling portion disposed opposite to said first coupling portion and disposed to be coupled to said first coupling portion; and
    a positioning mechanism including at least one positioning member for coupling said bottom portion of said air guide member to said side panel;
  said air guide member being convertible between a state of use where said air guide member is in the form of a hollow cylinder and said first coupling portion is coupled to said second coupling portion, and an unfurled state where said air guide member is in the form of a flat sheet and said first coupling portion is separated from said second coupling portion.

21. The computer housing according to claim 20, wherein said air guide member is formed from a flexible polyester material, and said air guide member further includes a plurality of height adjusting portions provided at a top portion thereof for tearing therefrom, and a plurality of tear lines provided among said height adjusting portions, each of said height adjusting portions being tearable along a corresponding one of said tear lines so as to adjust height of said air guide member.

22. The computer housing according to claim 20, wherein said first coupling portion is an engaging tab formed integrally with one side of said air guide member, and said second coupling portion is a retaining hole formed in the other side of said air guide member for retaining said engaging tab, said first coupling portion having two barbs disposed at two opposite sides of said first coupling portion to abuttingly engage edges of a wall defining said retaining hole.

23. The computer housing according to claim 22, wherein said air guide member further includes a guide tab on a same side as said first coupling portion, and a guide hole on a same side as said second coupling portion for extension of said guide tab therethrough.

24. The computer housing according to claim 20, wherein said air guide member further includes a plurality of third coupling portions that are disposed spacedly and angularly on said bottom portion of said air guide member, and said positioning mechanism further includes a plurality of fourth coupling portions that are disposed spacedly and angularly on said positioning member for engaging said third coupling portions.

25. The computer housing according to claim 24, wherein said positioning member has two spaced-apart concentric positioning rings projecting from one side thereof, said fourth coupling portions being disposed between said two positioning rings.

26. The computer housing according to claim 24, wherein each of said third coupling portions is a horizontal L-shaped positioning hole formed in said air guide member, each of said third coupling portions having an alignment hole portion and a retaining hole portion extending horizontally from one side of said alignment hole portion proximate to a top end thereof, each of said fourth coupling portions being an inverted L-shaped positioning hook projecting from one side of said positioning member, each of said fourth coupling portions having a base projecting from said positioning member and a retaining block projecting from an outer side of said base proximate to a top end thereof for engaging said retaining hole portion of the respective one of said third coupling portions.

27. The computer housing according to claim 24, wherein each of said third coupling portions is a positioning tab extending from a bottom end of said air guide member, each of said fourth coupling portions being a positioning hole formed in said positioning member for extension of the respective one of said positioning tabs therethrough.

28. The computer housing according to claim 25, wherein each of said third coupling portions is a substantially rectangular positioning hole formed in said air guide member, each of said fourth coupling portions being a positioning hook projecting from a wall surface of one of said positioning rings for engaging the respective one of said positioning holes.

29. The computer housing according to claim 20, wherein said positioning mechanism includes two of said positioning members for coupling said bottom portion of said air guide member to said side panel, each of said positioning members having a plurality of through holes, said positioning mechanism further including a plurality of positioning posts extending through said through holes, and a plurality of positioning pins extending through said side panel and engaging said positioning posts.

30. The computer housing according to claim 29, wherein said two positioning members each have one end connected to said bottom portion of said air guide member, and said air guide member further includes two slots formed in said bottom portion of said air guide member for retaining the other ends of said two positioning members such that when said air guide member is in the state of use, said positioning members overlap and intersect each other, and the other ends of said two positioning members are retained in said two slots, and such that when said air guide member is in the unfurled state, said two positioning members are spaced a certain distance apart from each other, and said two positioning members are disengaged from said two slots.

31. The computer housing according to claim 30, wherein each of said positioning members has a connecting portion connected to said bottom portion of said air guide member, and an engaging portion engaging a corresponding one of said slots, said engaging portion having two barbs disposed opposite to each other and abuttingly engaging edges of a wall defining the corresponding one of said slots.

32. The computer housing according to claim 31, wherein said connecting portion of each of said positioning members is spaced a certain distance apart from a bottom edge of said air guide member, and each of said positioning members has two slits extending respectively from two sides of said connecting portion to said bottom edge of said air guide member.

33. The computer housing according to claim 31, wherein said connecting portion of each of said positioning members is flush with a bottom edge of said air guide member, and each of said positioning members has a fold line adjacent to said engaging portion, said engaging portion of each of said positioning members being bendable along said fold line and being retained in the corresponding one of said slots.

34. The computer housing according to claim 29, wherein said air guide member further includes four slots formed in said bottom portion of said air guide member, each of said positioning members being removably connected to said air guide member, each of said positioning members having two engaging portions disposed respectively at distal ends thereof, each of said engaging portions including two barbs disposed opposite to each other and abuttingly engaging edges of a wall defining the corresponding one of said slots.

35. The computer housing according to claim 34, wherein said two positioning members overlap and intersect each other and are spaced a certain distance apart from a bottom edge of said air guide member.

36. The computer housing according to claim 34, wherein said two positioning members overlap and intersect each other, and are flush with a bottom edge of said air guide member, each of said positioning members having two fold lines respectively adjacent to said two engaging portions, said engaging portions of each of said positioning member being bendable along said fold lines and being retained in corresponding ones of said slots.

* * * * *